United States Patent [19]

Yamamoto et al.

[11] Patent Number: 4,690,867

[45] Date of Patent: Sep. 1, 1987

[54] MATERIAL FOR LOW MELTING POINT METAL CASTING EQUIPMENT

[75] Inventors: Tsutomu Yamamoto; Michio Nishiyama; Mitsuo Yamamoto; Masakazu Ozaki, all of Yokohama, Japan

[73] Assignee: Nichias Corporation, Tokyo, Japan

[21] Appl. No.: 846,222

[22] Filed: Mar. 31, 1986

[30] Foreign Application Priority Data

Apr. 5, 1985 [JP] Japan .................................. 60-71039
Feb. 12, 1986 [JP] Japan .................................. 61-26854

[51] Int. Cl.$^4$ .............................................. B32B 13/02
[52] U.S. Cl. .................................. 428/367; 428/379; 428/408; 106/38.28; 501/96; 501/154
[58] Field of Search ............... 428/367, 379, 408, 701, 428/702; 106/38.2, 38.27, 38.28, 287.1; 501/96, 154

[56] References Cited

U.S. PATENT DOCUMENTS 2,687,967 8/1954 Yedlick et al. ....................... 501/154
3,216,881 11/1965 Pfeifer ................................. 428/702
4,263,367 4/1981 Prewo ................................. 428/408
4,298,386 11/1981 Kubo et al. ......................... 501/154
4,511,663 4/1985 Taylor ................................. 428/408

FOREIGN PATENT DOCUMENTS 5126582 9/1980 Japan .................................. 428/446

Primary Examiner—John E. Kittle
Assistant Examiner—Beth A. Bozzelli
Attorney, Agent, or Firm—Tilton, Fallon, Lungmus & Chestnut

[57] ABSTRACT

The present invention provides an improved compositional material for a low melting point metal casting equipment and a method for producing the same, wherein said composition does not cause large cracks during operation even if there is a reduction in its physical strength resulting from the non-use of reinforcing asbestos fiber.

This material actually has a durability equivalent to/or greater than that of products reinforced with asbestos fiber.

6 Claims, 4 Drawing Figures

MATERIAL FOR LOW MELTING POINT METAL CASTING EQUIPMENT

BACKGROUND OF THE INVENTION

The present invention relates to novel and improved heat-resistant materials and their preparation thereof. More particularly, it relates to the materials for the casting equipment of non-ferrous molten metals which have comparatively low melting points such as aluminium, titanium, zinc etc., especially in regards to a material which constitutes a portion of such equipment that is directly in contact with the molten metal, and a method for producing the same.

For low melting point metal casting equipment, a variety of heat-resistant materials have been used to constitute the above mentioned portions for carrying out such things as molten metal transfer, supply and holding, for example pouring boxes, launders and troughs, holding furnace inner linings etc., floats, spouts, hot top rings etc., and among such material the calcium silicates have been widely used due to their excellent high heat insulating characteristics, small heat capacities and further their so-called non-wetting characteristics. However, the use of asbestos fiber which has been used since the past as a reinforcing fiber for such calcium silicate type materials has become difficult to use for well-known reasons. So the production of a product not containing such fibers, but still having characteristics equivalent to those of the product of the prior art reinforced with such fibers has been desired. Likewise, the replacement of the asbestos fiber with other fibers has also become necessary for calcium silicate molded products used as building materials or heat insulations, and the replacement with alkali resistant glass fiber has almost been successful and is being put into practice in those industries. However as far as a compositional material for casting equipment for low melting point metal is concerned, because of the special requirements for the material is this field, no satisfactory solution of this matter has been in sight. That is, since crystals composing a calcium silicate type molded body contains some crystalline water depending on various crystal forms when such material is employed as casting components for low melting point metal as it is, the crystalline water is dehydrated, becoming steam, to cause various troubles in the molten metal. Accordingly, it is necessary to eliminate the crystalline water and adsorbed water by heating at about 300°–600° C. for about 3–24 hours, but from such heat treatment the tensile strength of the alkali resistant glass fiber deteriorates to less than ½ of the original. Hence, physical properties such as elasticity, toughness, strength, etc. of the final product become unsatisfactory.

In order to resolve the problem of deterioration in physical strength of the reinforcing fiber from heat treatment, the invention according to Japanese Patent Publication No. 57-49507, adopts a method of burning wherein a calcium silicate molded body is produced from slurry comprising a mixture of lime and siliceous material having a $CaO/SiO_2$ mole ratio of 0.6–1.2, a xonotlite previously prepared by hydrothermal synthesis, a fibrous wollastonite, a reinforcing fiber and water, which is then burned. This method produces a calcium silicate molded body which has very little crystalline water from hydrothermal reaction, because the product consists largely of wollastonite as an unhydrate and xonotlite which has little crystalline water hence the subsequent heat treatment can be accomplished in a short time, with only slight deterioration of the reinforcing fiber by the heat treatment. In this production method, if the calcium silicate crystal produced from lime and silicious raw materials could be entirely low crystalline water containing xonotlite, the heat treatment could be extremely simplified or totally omitted. However, if the products of hydrothermal reaction has to be xonotlite, the autoclave condition for the molded body should be severe, hence creating a problem where the deterioration of the reinforcing fiber disturbs the exhibition of a satisfactory reinforcing effect. Consequently, a product according to this method would also have insufficient physical characteristics.

For the reasons mentioned above, if a calcium silicate with insufficient physical strength and toughness is employed as a compositional material for low melting point metal casting equipment, the biggest problem is the large cracks occurred during casting operation. Needless to say, it is easy to crack widely in a material with inferior physical characteristics and even in a material seemingly excellent in its physical characteristics due to the stress which is caused by the uneven temperature elevation from one side contact of the molten metal, and this defect could bring about serious accidents such as leakage of molten metal or equipment destruction. However, there are no operational countermeasures that can overcome the defect mentioned above.

On the other hand, simple insufficient physical strength can be overcome operationally by the use of sufficiently thick material or the use of a reinforcing back up material.

SUMMARY OF THE INVENTION

The purpose of the present invention is to provide an improved compositional material for low melting point metal casting equipment and a method for producing the same, wherein said composition does not generate large cracks during operation even if its physical strength is more or less reduced from the non use of a reinforcing asbestos fiber, and said composition actually has a durability equivalent to/or greater than that of product reinforced with asbestos fiber.

DESCRIPTION OF THE PREFERRED EMBODIMENTS

Figure 1:
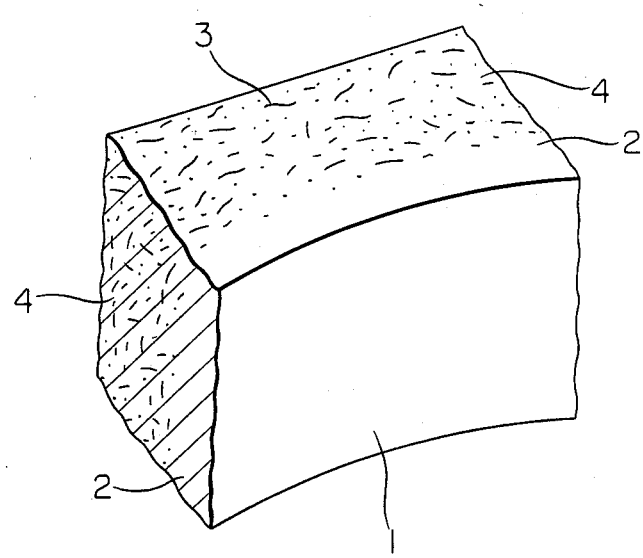
FIG. 1 is a perspective view of the material according to the present invention.

As seen from the model shown in FIG. 1, a compositional material for low melting point metal casting equipment of the present invention comprise a calcium silicious molded body, the matrix of which is substantially made up of a xonotlite, the zone 2 from the surface 1 which contacts the molten metal to a position several mm or about 20 mm distant from the surface 1 contains a relatively small quantity of or substantially no reinforcing fiber, characterized in that the fracture toughness of the zone 2 can be maintained lower than that of another zone 4 which contains sufficient reinforcing fibers 3 (hereinafter referred to as "Material A").

The present invention also provides a material for low melting point metal casting equipment wherein the material A mentioned above is exchanged for a material having two different fracture toughness zones usually through a single operation. Accordingly said exchanged material is a material which can be substantially used just as the material A which is namely a material for low melting point metal casting equipment comprising a calcium silicate molded body, wherein the calcium silicate matrix substantially comprises a xonotlite, and characterized in that carbon fibers are formulated as the reinforcing fiber (hereinafter refferred to as "Material B").

In the material A of the present invention, as mentioned above, the distribution of the reinforcing fiber is not uniform, but the matrix comprises a xonotlite type calcium silicate regardless of the presence or absence of the reinforcing fiber. Accordingly the difference in the fracture toughness mostly comes from the presence or absence of the reinforcing fiber and its content in the material. Furthermore, concerning the distribution of the reinforcing fiber, it is not necessary there be that a clear border dividing the zone containing substantially no or relatively little reinforcing fiber (hereinafter referred to as "low fracture toughness zone") and the zone containing a relatively high quantitity of the reinforcing fiber (hereinafter referred to as a "high fracture toughness zone"), therefore the contents of the reinforcing fiber progressively vary (with the fracture toughness also progressively varying) so that there may be intermediate zones existing therein.

Concerning the above low and high fracture toughness zones, when their respective fracture toughness index T's measured at typical portions thereof are compared, it is desirable that the difference between both fracture toughness index T's is to the degree of $T_0/T_1 = 0.1-0.5$. The fracture toughness index T is a value calculated using the folliwng formula where $T_0$ is the fracture toughness index of the low fracture toughness zone and $T_1$ is that of the high fracture toughness zone:

$$T = (\Gamma_1 + \Gamma_2)/\Gamma_1$$

(wherein $\Gamma_1$ indicates an integrated value on a load-deflection curve until cracking appears on the test piece in a three point bending test on a $\Gamma_1$ mm width, 10 mm thick and 100 mm span test piece at a 1 mm/min. heat speed, and $\Gamma_2$ indicates an integrated value on the load-deflection curve after the cracking until the deflection extends up to 2 mm).

When the material A of the present invention is heated during operation from the surface contacting the molten metal, cracking is caused on the portion near that surface by thermal stress generated from the non uniform thermal expansion which is caused by the difference of temperature between surface 1 and surface 4 of the material A, just as in products of the prior art. However, the cracking in this material A, a number of cracks are generated from in the early stages when the stress is still comparatively low since the fracture toughness of the crack generating portion of the material is low. Hence, the stress is relieved by this crack generation, and the remaining stress can be supported by the high fracture toughness zone which is reinforced with a sufficient quantity of fiber. Therefore, the growth of the cracking is stopped when the cracks are fine, without penetration into the high fracture toughness zone. The groups of fine cracks thus formed act to relieve the stress during the heating/cooling cycles repeated in subsequent operations to protect the material from the generation of large cracks.

As can be clearly understood from the stress relieving mechanism and the cracking inhibitive action of material A mentioned above, even though the absolute values of the physical characteristics of these two zones of material A such as the fracture stress index, elastic modulus etc. are not specifically restricted, they should preferably be ranged: so that the fracture toughness index of the low fracture toughness zone is within 1–1.5, the fracture toughness index of the high fracture toughness zone greater than 3 and the bending elastic modulus is greater than $5 \times 10^3$ kg/cm$^2$.

The material A of the present invention may be a material which maintains a low fracture toughness zone from before the operation, wherein fine cracks as mentioned above have been previously provided by heating from the side for contacting surface with a molten metal or by a thermal hysterisis in the producing step before the operation.

In the material B of the present invention wherein the reinforcing carbon-fibers are uniformly distributed in the material itself, after constructing metal casting equipment with the material B, the carbon fibers near the surface for contacting the molten metal are burnt down providing a low fracture toughness zone by which the material B is substantially converted to the material A, at the initial operation or by heating from the side of the molten metal contacting surface. The material B converted to the material A completely behaves and exhibits the same characteristics as the real component A.

The compositional material for low melting point metal casting equipment of the present invention may be a material containing a wollastonite type calcium silicate unhydrate crystal in a highly dispersed state other than the xonotlite composing the matrix such as the product according to Japanese Patent Publication No. 57-49507.

As mentioned above, there are various methods for producing a calcium silicate molded body having uneven distribution of reinforcing fiber, representative methods being indicated below:

(1) Carbon fiber, wood pulp, rayon, heat resistant organic synthetic fibers (for example an entirely aromatic polyamide) etc., carbonized or burnt down by heating in air at 200° C. to over 400° C. to lose their reinforcing function are employed as the reinforcing fiber, and a molded body having a uniform distribution of reinforcing fiber is prepared by any method, after which all or the greater quantity of the reinforcing fibers near the molten metal contacting surface are carbonized or burnt down by heating the side of the contacting surface with a molten metal.

(2) Firstly, a double layer structured calcium silicate molded body in which each layer a different kind of reinforcing fiber is contained, is prepared from two kinds of materials having different kinds of reinforcing fiber formulates therein. In this case, when preparing the low fracture toughness zone layer, such flammable reinforcing fibers employed in the above method (1) are employed, and for the other layer such inorganic fibers as metal fibers (for example stainless steel fiber), ceramic fibers (for example alumino-silicate type ceramic fibers) etc. are employed (when an organic fiber is employed in the low layer forming the low fracture toughness zone, a carbon-fiber can also be employed in the other layer). Thereafter the flammable fibers (formulated in the layer) are carbonized or burnt down just as in method (1) above.

(3) A double layer structured calcium silicate molded body having different reinforcing fiber content in each layer is prepared from two kinds of raw material having different amounts of reinforcing fibers formulated therein.

In producing the material of the present invention, the most advantageous method of obtaining a matrix substantially comprising xonotlite is to first, molding a slurry comprising a uniform mixture of (A)-(E) described below, subsequently is curing said molded body in an atmosphere of steam until a matrix substantially comprising xonotlite is formed and then drying:

(A) a mixture of lime material and a silicate material in a $CaO/SiO_2$ mole ratio of 0.9-1.3
(B) a xonotlite slurry previously prepared by hydrothermal synthesis (about 5-170 parts by weight as a solid)
(C) a fibrous wollastonite (about 10-150 parts by weight)
(D) a reinforcing fiber (1-about 13 parts by weight)
(E) water Wherein the above numerical values in parenthesis indicate the preferable formulating quantity per 100 parts by weight of the raw-material (A), likewise the quantity of the reinforcing fiber indicates a preferable quantity for forming a high fracture toughness zone. Particularly the most preferable formulating quantities of the raw material are: xonotlite 11-50 parts by weight, fibrous wollastonite 16-111 parts by weight and reinforcing fiber 2-8 parts by weight.

This method is basically similar to the method of the above-mentioned Japanese Patent Publication No. 57-49507. That is, such lime sources as hydrate lime, calcined lime, carbide slag etc., and such silicate sources as diatomaceous earth, quartzite, ferrosilicon dust etc. can be employed as both raw materials for the raw material mixture (A) respectively, and the xonotlite slurry for the raw material (B) can be prepared by well-known conventional methods wherein the siliceous raw material and the lime raw material are reacted in a slurry state under stirring in a pressurized autoclave. As the fibrous wollastonite, "NYARD-G:, a product of Interpace Co., U.S.A., can by suitably employed. Even though fibrous wollastonite is called "fibrous", it only presents a long and slender fiber like state and its actual macroscopic shape is a powdered state, thus the fibrous wollastonite is not used as a fibrous reinforcing material. The contribution of this raw material is in providing good dimensional stability and machinability of the product.

As mentioned above, a variety of materials can be employed as the reinforcing fiber, however in view of less deterioration of the fiber strength in the production step prior to the heat treating, carbon fiber is the most preferable one. Either a polyacrylonitrile base or a pitch base carbon fiber are acceptable and the fiber length thereof should preferably be ranged within 3-10mm. Moreover, a small quantity (preferably about less than 3% of the total solid content) of another fiber for merely providing better moldability of the slurry, for example, pulp, rayon, polyester fiber, rock wool, alkali-resistant glass fiber etc. can also be formulated beside the reinforcing fiber.

These raw materials are mixed along with a sufficient quantity of water to obtain a slurry state.

After obtaining a uniform slurry, said slurry is molded into a thick plate-like or other shaped body required as a constructional element for casting equipment for low melting point metals, and it is preferable that this molding should be carried out under such conditions that the density of the final product be within 0.5-1.0 $g/cm^3$, preferably 0.65-0.90 $g/cm^3$. A product having an excessively low density exhibits not only insufficient mechanical strength but also excessively high air permeability which results in the defect of rapid deterioration during operation of the inflammable reinforcing fibers such as carbon fiber etc. Furthermore, in the production of material A, when a double layer structured molded body is produced by the above mentioned methods (2) or (3) from two kinds of slurry raw materials, said two layer laminated structure is formed in this molding step.

The molded body is subsequently transferred into an autoclave and subjected to curing under a steam atmosphere. This hydrothermal treatment should be carried out under such conditions whereby the lime material and the siliceous material are reacted in producing xonotlite and the reaction needs to be continued until it is substantially complete. As the actual operating conditions, a steam pressure higher than 14 $kg/cm^2$ and a reaction period of time of about 5-48 hours are required. Thus, even though the reaction conditions just for substantially producing the xonotlite are severe as mentioned above, the carbon fibers are sufficiently resistant with almost no deterioration in their strength and they remain in the cured molded body.

The xonotlite produced by a reaction of the lime material and the siliceous material further chemically bonds with the xonotlite admixed in the previously prepared raw material for molding in forming a matrix comprising xonotlite. It can be felt that the fibrous wollastonite and the carbon fiber are employed for merely filler in the xonotlite base matrix, and does not make a strong chemical bond with the other raw materials.

The molded body cured by hydrothermal treatment is taken out from the autoclave and dried in hot air of less than about 330° C., thus actually completing the matrix portion of the material according to the present invention.

Subsequently, when the material A is produced by means of the method (1) or (2) mentioned above by burning out a part of the reinforcing fiber, the molded body should be heated from the side which is to contact the molten metal in an oxidizing atmosphere. This uneven burning not only carbonizes and burns out the reinforcing fiber, but also slightly deteriorates the physical characteristics of the matrix portion near the heated surface, deteriorating the fracture toughness in this zone.

The material for low melting point metal casting equipment of the present invention has a special structure wherein a little reinforcing fibers present near the contacting surface which contacts with molten metal providing a low fracture toughness there acts as a stress relaxing layer, and even though its mechanical strength appears to be low it suppresses the generation of large cracks which induce the entire destruction of equipment or the leakage of molten metal, which in comparison with the materials of the prior art wherein the asbestos fiber was merely replaced with an alkali-resistant glass fiber etc., the material of the present invention inhibits an incomparably superior durability. Namely, when the material of the present invention is, for example, employed in a 700° C. aluminum molten bath casting equipment, the material can withstand more than 100 repeated operations, an endurance which is rivalling that of the material by prior art containing asbestos fiber.

Moreover, the material of the present invention has excellent machinability such as cutting, grinding etc. and meets all of the characteristics required in relation to contacting molten metal.

Consequently, the present invention provides a practical material for low melting point metal casting equipment without using the asbestos fiber, the present invention will therefore greatly contribute to improvements in the working environment and to cost reductions in this industry.

EXAMPLES

The present invention will be further explained in depth referring to the working examples and the comparative examples hereinafter. "Part" refers to "parts by weight" in these examples.

EXAMPLE 1

Figure 2:
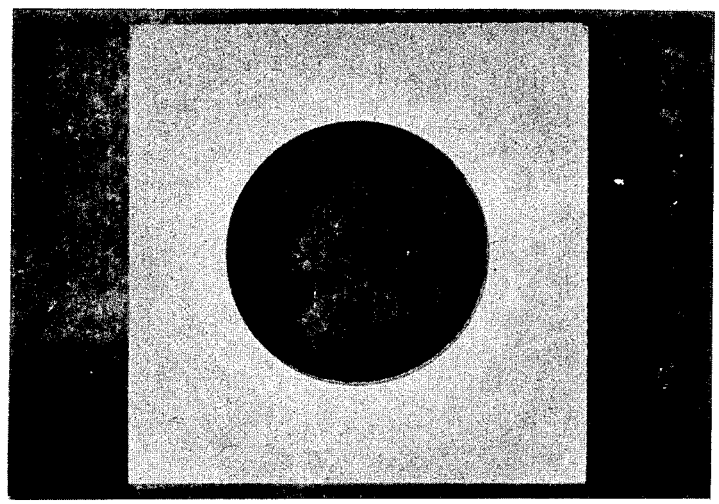
FIG. 2 is a photograph of a device for casting a low melting point metal prepared according to Example 1 and after heating.
Figure 3:
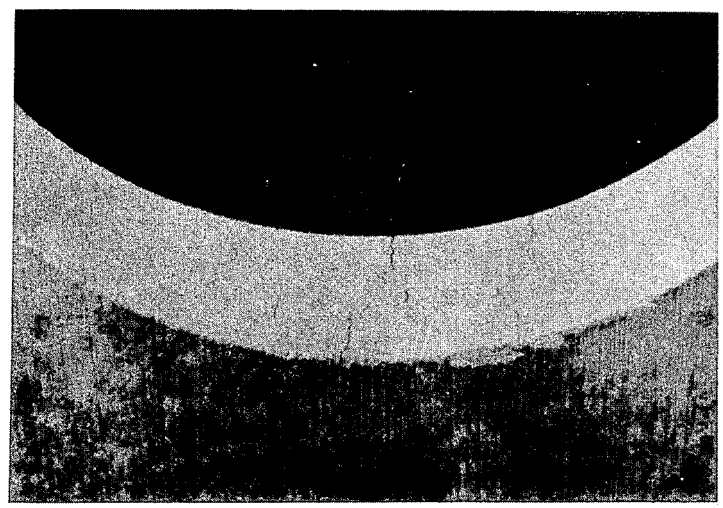
FIG. 3 shows a partial enlargement of FIG. 2.

Sufficiently mixing silica sand 30 parts, hydrated lime 40 parts, xonotlite slurry 20 parts (in solid form) previously synthesized by an agitating type autoclave, fibrous wollastonite 45 parts, polyacrylonitrile base carbon fiber 3 parts and water 1000 parts, said mixture was molded with a press to obtain a 50 mm thick tabular molded body, subjected to steam curing under a vapor pressure of 205° C.17 kg/cm$^2$ for 48 hours, the molded body subsequently being dried in hot air to obtain an intermediate product. Accordingly to X-ray diffraction, this intermediate product was a calcium silicate substantially comprising xonotlite. Next, this tabular intermediate product was cut to obtain a rectangular body sized 220 mm×220 mm×50 mm having a hole of 125 mm $\phi$ in the center of the body, furthermore a low fracture toughness zone was formed in the molded body by burning down most of the carbon fibers in the area from the surface down to a 15 mm depth of the hole inner surface at 750° C. for 30 min., thus producing the material for low melting point metal casting equipment of the present invention, the photograph of which is shown in FIG. 2 which shows only localized cracking.

EXAMPLE 2

30 parts silica sand, 15 parts ferrosilicon dust, 5 parts hydrated lime, 20 parts xonotlite slurry (as solids) previously synthesized by an agitating type autoclave, 30 parts fibrous wollastonite, 6 parts pitch base carbon fiber and 1200 parts water thoroughly were mixed after which said mixture was molded into a tabular body with a press, steam curing was carried out on said tabular body under the vapor pressure of 205° C./17 kg/cm$^2$ for 15 hours, after which said tabular body was dried in hot air, to obtain an intermediate product. According to X-ray diffraction, this intermediate product was calcium silicate substantially comprising xonotlite.

In the subsequent step, the product was cut and burnt in the same manner as in Example 1, forming a low fracture toughness zone by burning most of the carbon fibers in the zone from the surface down to 15 mm depth of the hole inner surface, thus obtaining a compositional material for low melting point metal casting equipment of the present invention.

EXAMPLE 3

Except for the matter that the burning treatment in the final step was not carried out, the material of the present invention reinforced with carbon fibers uniformly distributed therein was produced in the same matter as Example 1.

EXAMPLE 4

Except for the matter that the burning treatment in the final step was not carried out, the material of the present invention reinforced with carbon fibers uniformly distributed therein, was produced in the same manner as Example 2.

COMPARATIVE EXAMPLE 1

Figure 4:
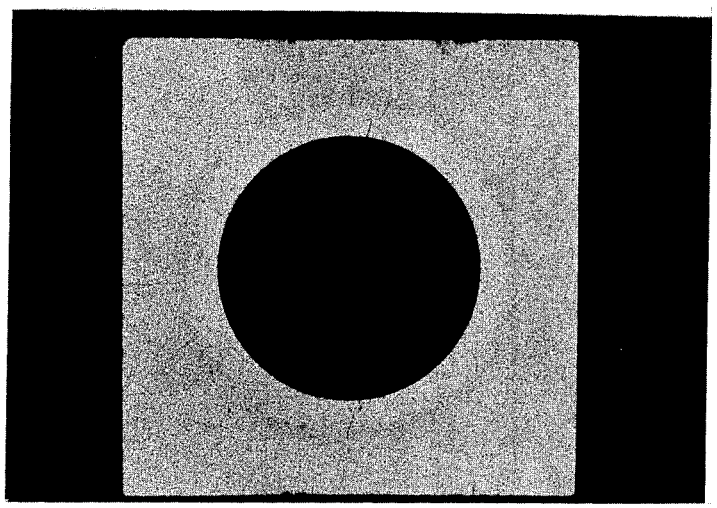
FIG. 4 is a photograph of a device for casting a low melting point metal prepared according to Comparative Example 1, after being heated under the same conditions as Example 1.

Instead of 3 parts carbon fiber, 5 parts of alkaliresistant glass fiber was employed to produce a calcium silicate molded body in the same manner as Example 1 except that the heat treatment in the final step was not carried out, the photograph of this Example is indicated in FIG. 4 which shows the cracking reacting throughout the wall.

COMPARATIVE EXAMPLE 2

Instead of 3 parts carbon fiber, 6 parts stainless steel fiber was employed to produce a calcium silicate molded body in the same manner as Example 1 except that the heat treatment in the final step was not carried out.

The physical characteristics of the products in each of the above examples are indicated in the following table 1.:

TABLE 1

| Product | Density (g/cm$^3$) | Bending Strength (kg/cm$^2$) | E* (kg/cm$^2$) | Fracture Toughness Index. T |
|---|---|---|---|---|
| Example 1 | | | | |
| High Fracture Strength Zone | 0.73 | 73 | 1.8 × 10$^4$ | 6.0 (Tl) |
| Low Fracture Strength Zone | | | 1.1 × 10$^4$ | 1.1 (To) |
| | | | | (To/Tl = 0.18) |
| Example 2 | | | | |
| High Fracture Strength Zone | 0.70 | 75 | 1.6 × 10$^4$ | 3.5 (Tl) |
| Low Fracture Strength Zone | | | 1.0 × 10$^4$ | 1.1 (To) |
| | | | | (To/Tl = 0.31) |
| Example 3 | 0.73 | 73 | 1.8 × 10$^4$ | 6.0 |
| Example 4 | 0.70 | 75 | 1.1 × 10$^4$ | 1.1 |
| Comparative Example 1 | 0.74 | 70 | 2.2 × 10$^4$ | 1.5 |
| Comparative Example 2 | 0.75 | 70 | 1.9 × 10$^4$ | 6.2 |

*Bending Elastic Modulus

Furthermore, the following heat resistant test on the above products was carried out. That is, the processed tabular test pieces having a hole prepared as above were stacked in, a molten aluminum (temperature: 750° C.) was next poured into the inside of the cylindrical stacked body prepared above and the molten bath was continuously heated by a heater so as to be maintained at 750° C. for 1 hour. After that, the piled body was cooled down to room temperature by drawing out the molten bath, and then the molten aluminium was repoured into the cylindrical stacked body again.

In this test, there was a leak of molten bath with the product of Comparative Example 1 caused by big cracks generated mainly in two places extending to the peripheral wall of the body after the molten aluminum was poured 1-3 time. Although the product of Comparative Example 2 exhibited better durability than that of Comparative Example 1, after the molten bath was poured 10-30 times from big cracks generated in two places extending to the peripheral wall of the body causing a molten bath leakage.

In contrast to the above products of the prior art, in the products of Examples 1-4 only a number of fine cracks dispersed in the low fracture toughness area facing the molten aluminum were generated, hence these products according to the present invention can easily withstand 50-150 repetitions of the molten aluminum pouring before the cracks extend to the peripheral wall of the body to cause a leakage.

What we claim is:

1. A material for low melting point metal casting equipment comprising a calcium silicate molded body reinforced with fibers, characterized in that the matrix of said molded body substantially comprises xonotlite, that a surface of said molded body coming in contact with any molten metal to be cast and the zone near the surface substantially contain no reinforcing fibers or less reinforcing fibers than that of other zones, thereby providing that the fracture toughness of said surface or zone is lower than that of said other zones.

2. A compositional material according to Claim 1, wherein the ratio of a fracture toughness index $T_o$ of the zone substantially containing no reinforcing fiber or containing fibers at a relatively low formulating proportion, and a fracture toughness index $T_1$ of the zone containing fibers at a relatively high formulating proportion, that is $T_o/T_1$, is 0.1-0.5.

3. A compositional material according to Claim 1, wherein the reinforcing fiber is a carbon fiber.

4. A compositional material for low melting point metal casting equipment comprising a calcium silicate molded body, the matrix of which substantially comprises xonotlite, characterized in that about 0.7 to about 5.9 weight % of carbon fiber is dispersed in said matrix.

5. A compositional material according to claim 4 wherein the fibrous wollastonite is contained in a uniformly dispersed state.

6. A compositional material for low melting point metal casting equipment comprising a calcium silicate molded body comprising xonotlite as matrix and 0.7 to 5.9 weight % of carbon fiber are reinforcing fiber, characterized in that, when the material is used for casting metal at least one time, the carbon fibers near the surface for contacting the molten metal are burnt down whereby a surface of said molded body coming in contact with any molten metal to be cast and the zone near the surface comes to contain substantially no reinforcing fibers or less reinforcing fibers than than of other zones, thereby providing that the fracture toughness of said surface or zone is lower than that of said other zones.

* * * * *

UNITED STATES PATENT AND TRADEMARK OFFICE
CERTIFICATE OF CORRECTION

PATENT NO. : 4,690,867

DATED : Sept. 1, 1987

INVENTOR(S) : Tsutomu Yamamoto; Michio Nishiyama; Mitsuo Yamamoto; Masakazu Ozaki It is certified that error appears in the above-identified patent and that said Letters Patent is hereby corrected as shown below:

n column 10, line 28 "than than of" should be - than that of -.

Signed and Sealed this

Twenty-ninth Day of November, 1988

Attest:

DONALD J. QUIGG

Attesting Officer

Commissioner of Patents and Trademarks